United States Patent [19]

Meister

[11] Patent Number: 4,742,847
[45] Date of Patent: May 10, 1988

[54] EXCESS PRESSURE VALVE FOR A BOILER OF A STEAMER FOR THE STEAM TREATMENT OF FOOD

[76] Inventor: Siegfried Meister, Siemensstrasse 2, 8910 Landsberg/Lech, Fed. Rep. of Germany

[21] Appl. No.: 945,203

[22] Filed: Dec. 22, 1986

Related U.S. Application Data

[63] Continuation of Ser. No. 760,880, Jul. 31, 1985, abandoned.

[30] Foreign Application Priority Data

Aug. 2, 1984 [DE] Fed. Rep. of Germany ....... 8423019

[51] Int. Cl.[4] .................... A47J 27/16; F16K 17/12
[52] U.S. Cl. ............................ 137/533.29; 219/401; 220/208
[58] Field of Search ............................ 220/208, 366; 137/533.21, 533.29, 541; 219/271, 401

[56] References Cited

U.S. PATENT DOCUMENTS

| | | | |
|---|---|---|---|
| 491,957 | 2/1893 | Welsh | 137/533.29 |
| 1,620,719 | 3/1927 | Buck | 137/533.29 |
| 1,638,589 | 8/1927 | Louw | 137/533.29 |
| 1,774,690 | 9/1930 | Willoughby | 137/541 |
| 1,958,590 | 5/1934 | Pierce | 219/401 |
| 2,289,204 | 7/1942 | Milton | 219/271 X |
| 2,834,374 | 5/1958 | Klinkenberg | 137/541 |
| 3,302,664 | 2/1967 | Plamann | 220/366 X |
| 3,818,819 | 6/1974 | Shulz | 219/401 X |

*Primary Examiner*—Robert G. Nilson
*Attorney, Agent, or Firm*—Hill, Van Santen, Steadman & Simpson

[57] ABSTRACT

There is disclosed herein an excess pressure valve for the boiler of a steamer for the steam treatment of food. The boiler includes a pipe leading outward from inside the boiler and the external end has an annular sealing face. A conical valve body closes the pipe to the outside and a packing ring is provided for engaging the sealing face. The valve body has a solid core and an elongated terminally widened shaft which extends into the perpendicular end portion of the pipe. The pipe has a constriction between the shaft end and core which traps the shaft end.

10 Claims, 1 Drawing Sheet

U.S. Patent May 10, 1988 4,742,847
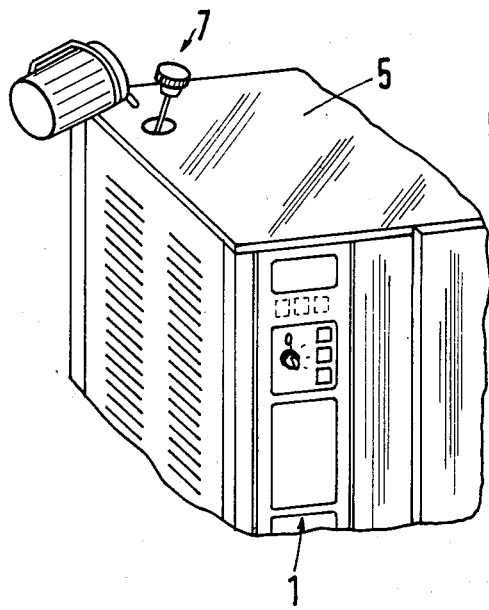
Fig. 1
Fig. 2
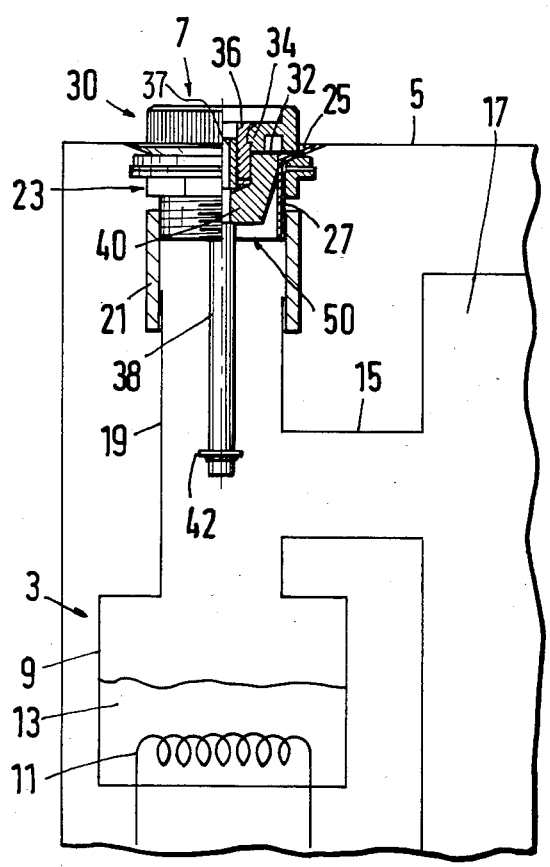
Fig. 3
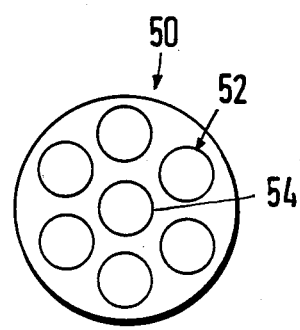

EXCESS PRESSURE VALVE FOR A BOILER OF A STEAMER FOR THE STEAM TREATMENT OF FOOD

This is a continuation of application Ser. No. 760,880, filed July 31, 1985, now abandoned.

BACKGROUND OF THE INVENTION

The present invention relates to an excess pressure valve for a boiler of a steamer for the steam treatment of food, with a pipe leading from the inside of the boiler to the outside and whose external end portion has an annular sealing face, as well as a conical valve body which seals the pipe with respect to the outside and which is equipped with a ring packing for engaging on the sealing face.

In the case of this combination steamer known from German Utility Model No. 8,131,827, the boiler is used for generating steam, which can be supplied to the cooking area via connecting pipes. The water whose heating leads to the generation of the steam in the boiler contains, as a function of its hardness, dissolved calcium compounds which, over a period of time, can be deposited on the heater and the inner walls of the boiler as so-called scale. Thus, a possibility must be provided for supplying a decalcifying solution to the boiler water.

However, for operating the boiler for steam generation purposes, it is desirable and possibly necessary to equip the boiler with an excess pressure valve, through which the steam can escape to the outside when a predetermined overpressure is reached in the boiler.

SUMMARY OF THE INVENTION

According to the invention, the excess pressure valve is constructed in such a way that it permits the filling of the boiler with decalcifying solution.

According to the invention, in the case of an excess pressure valve, particularly having the aforementioned features, the valve body has a solid core, as well as an elongated, terminally widened shaft extending into the perpendicular end portion of the pipe whilst, between the shaft end and the core, the pipe has a constriction which traps the shaft end. The valve body, whose closing force seals the pipe with respect to the outside, is mainly provided by the weight of the solid core, rests loosely on the sealing face and can therefore be easily removed from the pipe end for filling the boiler e.g. with decalcifying solution, but remains on the pipe as a result of the trapped shaft end. This makes unnecessary additional devices, e.g. for rinsing decalcifying solution into the boiler, but the very simple construction still ensures an adequate sealing of the boiler from a safety standpoint.

According to a preferred development of the invention, the conical core engages sealingly on an annular face in the pipe filler connection.

According to an appropriate embodiment of the invention, the valve body ring packings can either be constructed on the actual core or can be fixed as a separate sealing element between the core and a handle of the valve body.

The shaft extending into the end portion of the pipe appropriately has an attached disk at its end and the external diameter of said disk is larger than the internal diameter of the pipe constriction.

Also, in a particularly simple manner, the pipe constriction can be obtained in that a feed sieve is fixed in the filler connection of the pipe end portions below the valve body and through the central opening of said sieve extends the shaft, the external diameter of the widened shaft end being larger than the central bore of the feed sieve.

The shaft appropriately extends by a multiple of the axial length of the valve body into the pipe, so that for filling the boiler, the valve body adequately frees the pipe opening.

Appropriately, the pipe is constructed as a branch from the steam supply pipe connecting the boiler interior with the cooking area.

BRIEF DESCRIPTION OF THE DRAWINGS

The invention is described in greater detail hereinafter relative to a non-limitative embodiment and the attached drawings.

FIG. 1 is a diagrammatic perspective view of part of the steamer having the features of the invention.

FIG. 2 is a diagrammatic representation of the excess pressure valve, partly in axial section.

FIG. 3 is a plan view of the feed sieve according to FIG. 2.

DESCRIPTION OF THE PREFERRED EMBODIMENTS

The combination steamer described in detail in German Utility Model No. 8,131,827 is provided behind the control panel 1 with the operational parts which, apart from the necessary control system, includes a steam generator 3 in the form of an electrically heated boiler. The excess pressure valve 7 projects upwards from the cover plate 5 and the steam can escape from the same, said steam flowing out of the boiler 3 on exceeding a maximum pressure determined by the excess pressure valve.

Boiler 3 essentially comprises a water tank 9, which contains an electric heater 11, e.g. in the form of one or more heating cartridges. In operation, water tank 9 is filled with water 13 so as to cover heater 11, said water flowing from a not shown feed line into tank 9.

From the upper end of water tank 9, a steam pipe 15 leads via a bend to the cooking area 17, so that the steam generated by boiling the water 13 in water tanks 9 can be supplied to the cooking area 17.

A pipe 19 branches from the end of steam pipe 15 and pipe 19 is connected via a sleeve 21 to a filler connection 23 with a substantially perpendicular axis. The filler connection 23 comprises, starting from cover plate 5, a funnel-shaped sunk cavity 25, which is constructed as a circular sealing face for ring packing 32 of valve body 30.

Sunk cavity 25 inwardly passes into a perpendicular pipe socket 27 provided with an external thread and which is oriented onto pipe 19. As shown in the drawings, the cavity 25 and pipe socket 27 is a one-piece externally threaded member. At the bottom, a feed sieve 50 is constructed on pipe socket 27 and its planar base, which is provided with a plurality of holes 52, seals the pipe socket 27 to the inside. Holes 52 include a central hole 54, to which further reference will be made hereinafter.

Valve body 30 comprises a cylindrical shaped part in the form of a cap 34 with a milled circumferential surface, which has an inwardly projecting, annular shoulder 36 with an internal thread. An elongated, cylindrical shaft 38 is screwed firmly into shoulder 36 and projects from the valve body 30 by roughly twice the axial length thereof. A solid, downwardly conically tapering block 40, e.g. of high-grade steel is fixed around shoulder 36 and the portion of shaft 38 adjacent to the latter. As shown in the drawings, the shaft 38 is stepped so as to have reduced diameter portions at the top end thereof. A collar 37 is secured to the uppermost portion of the shaft 38 and threadably engages the shoulder 36 so as to cooperate in securing the shoulder 36 and cap 34 to the shaft 38. Thus, between the planar surface of block 40 and cap 34 is secured a soft ring packing 32, which projects radially over the block and is supported against the lower outer periphery of cap 34. The lower end of shaft 38 is widened in such a way that a disk 42 is secured on said shaft. The external diameter of disk 42 is larger than the internal diameter of the central opening 54 of feed sieve 50. As shown, shaft 38, which is thinner than the aforementioned internal diameter of opening 54, extends through the latter and when the valve body 30 is located on the filler connection 23 projects into pipe 30 roughly to the bend of steam pipe 15.

The closing force of excess pressure valve 7 is essentially determined by the weight of valve body 30, i.e. essentially by the weight of block 40, which is dimensioned in such a way that the valve body 30 is raised from its seat in the sunk cavity 25 when the steam pressure in boiler 3 exceeds a predetermined limit. The steam can then escape to the outside between block 40 and ring packing 32, as well as sunk cavity 25. If the steam pressure in boiler 3 is below the limit, by the engagement of ring packing 32 and also the engagement of an annular area of the circumferential surface of block 40 on the sealing face of sunk cavity 25, valve body 30 seals the pipe 19.

If, as represented in FIG. 1, tank 9 is to be filled with a water softening solution, valve body 30 on cap 34 can be raised from the sunk cavity 25 upwards and somewhat to the side to such an extent that the softening solution can be poured through cavity 25, via the filler connection 23 and pipe 19 into tank 9. Through the engagement from below of disk 42 with the filler sieve 50, the valve body remains trapped in the filler connection 23 and on release automatically drops back into its seat again.

The invention is not restricted to the details of the represented embodiment.

I claim:

1. An excess pressure valve for a boiler of a steamer for the steam treatment of food, which includes a pipe leading outwards from the inside of the boiler and whose external end portions have an annular sealing face, a conical valve body which closes the pipe to the outside and has a packing ring for engaging the sealing face, characterized in that said pipe includes means defining a constriction extending across said pipe and positioned adjacent said annular sealing face; said valve including:
    an elongated shaft extending through said constriction means, one end of said shaft having an enlarged portion for engaging said constriction means and limiting movement of the valve body relative to said constriction means, and the other end of said shaft having a reduced diameter intermediate section and a smaller reduced diameter end section; and
    said valve body having:
        a tapered block member that defines a central aperture constructed to interfit with the intermediate first reduced diameter section and be positioned between the shaft body and said second smaller end section, said block member having a periphery for engaging said pipe;
        a collar secured to the smaller end section of the shaft for cooperation in securing the block on the intermediate diameter section;
        tubularly-shaped shoulder means for engaging said collar, cooperating in retaining said block in position and defining cap engaging means; and
        cap means for engaging said annular face and supporting said valve body in sealing position against said annular face, said cap means including a central aperture for engaging said shoulder means and securing said cap means thereto.

2. An excess pressure valve as in claim 1, wherein said packing ring means is positioned between said cap and said block means for engaging said annular sealing face.

3. An excess pressure valve as in claim 1, wherein said valve body is biased to a closed position in engagement with said sealing face only by gravity.

4. An excess pressure valve as in claim 3, wherein the shaft length is at least twice the length of the valve body.

5. An excess pressure valve as in claim 1, wherein said constriction means is positioned adjacent said valve body, in the valve-closed position, and the distance between the constriction means and enlarged end of the shaft is at least twice the length of the valve body.

6. An excess pressure valve as in claim 1, wherein said valve body is of a shape and weight to counterbalance pressures within said boiler which are less than a predetermined limit and to open by disengaging from said annular sealing face when pressures within said boiler exceed said predetermined limit so as to vent said boiler to atmosphere.

7. An excess pressure valve as in claim 6, wherein said predetermined pressure limit is about atmospheric pressure.

8. An excess pressure valve as in claim 1, wherein said cap is provided with internal threads and said shoulder means is provided with external threads, and said cap is secured to said shoulder and shaft by threaded engagement of the internal threads of said cap and external threads of said shoulder.

9. An excess pressure valve for a boiler of a steamer for the steam treatment of food which includes a pipe leading outwards from the inside of the boiler and whose external end portion defines an annular sealing face and a conical valve member which closes the pipe to the outside and has a packing ring for engaging the sealing face, characterized in that said pipe includes means defining a centrally-apertured constriction extending across said pipe and positioned adjacent said annular sealing face and said valve member including a conically shaped valve head and an elongated stem extending therefrom through said constriction means toward said boiler, the length of the stem being at least twice the length of the valve head and having at the one end thereof an enlarged portion for trapping engagement of said constriction;
    said valve head including a tapered block member positioned on said stem adjacent the other end of said stem, means for securing said block to said stem and cap means for engagement with said securement means for engaging said block and said cap having a diameter greater than said pipe.

10. An excess pressure valve as in claim 9, wherein said packing means is positioned between said block and said cap means for engagement with said annular sealing face, said packing means being engaged by and held by and between said cap means and block for sealing engagement with said annular face.

* * * * *